(12) United States Patent
Kilian et al.

(10) Patent No.: US 8,539,447 B2
(45) Date of Patent: Sep. 17, 2013

(54) REAL-TIME VALIDATION OF INTERACTIVE APPLICATIONS

(75) Inventors: Bryan Kilian, Renton, WA (US); Andrew Clinick, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1079 days.

(21) Appl. No.: 12/132,622

(22) Filed: Jun. 4, 2008

(65) Prior Publication Data

US 2009/0307666 A1  Dec. 10, 2009

(51) Int. Cl.
  *G06F 9/44*  (2006.01)
(52) U.S. Cl.
  USPC ............ 717/124; 717/125; 717/127; 717/128
(58) Field of Classification Search
  USPC .................................. 717/124, 125, 127, 128
  See application file for complete search history.

(56) References Cited

U.S. PATENT DOCUMENTS

| | | | | |
|---|---|---|---|---|
| 5,835,910 A | * | 11/1998 | Kavanagh et al. | 707/999.103 |
| 6,145,121 A | * | 11/2000 | Levy et al. | 717/135 |
| 6,173,440 B1 | * | 1/2001 | Darty | 717/130 |
| 6,502,102 B1 | | 12/2002 | Haswell et al. | |
| 6,731,309 B1 | | 5/2004 | Unbedacht et al. | |
| 7,721,262 B2 | * | 5/2010 | Reinhardt | 717/124 |
| 2005/0289517 A1 | | 12/2005 | Balfe et al. | |
| 2006/0010258 A1 | | 1/2006 | Zare et al. | |
| 2006/0259898 A1 | | 11/2006 | Reinhardt | |

OTHER PUBLICATIONS

Lukoit, et al. "TraceGraph: Immediate Visual Location of Software Features", 2000, IEEE, p. 33-39.*
"Document Object Model (DOM) Level 3 Validation Specification", Jan. 27, 2004, pp. 1-46.
"HD DVD Authoring", http://www.thisishddvd.com/hddvdauthoring.aspx., 2007, p. 1.
Michael Morrison, "Creating Responsive GUIs with Real-Time Validation", http://www.webreference.com/programming/ajax_construcciton_kit/, 2007.

* cited by examiner

*Primary Examiner* — Qamrun Nahar
(74) *Attorney, Agent, or Firm* — Microsoft Corporation

(57) ABSTRACT

A validation tool providing real-time validation of interactive content applications includes a static analysis engine that extrapolates the timeline of an application and the application's behavior over that timeline. The static analysis engine watches various types of data associated with the application's markup document and works through an editor to inform the user if the application has exceeded defined limits as the application is being built. The validation tool is further configured with a dynamic simulator that is arranged as a state machine that shares state information with the static analysis engine to enable the validation tool to display useful information such as pixel buffer usage at a given time code. The validation tool is further configured to provide a real-time application preview with which the user may interact to immediately evaluate cause and effect of any changes that are made in the application code using the editor.

14 Claims, 7 Drawing Sheets

REAL-TIME VALIDATION OF INTERACTIVE APPLICATIONS

FIELD OF THE INVENTION

The invention relates generally to methods and tools for validating software applications.

BACKGROUND

Developers of applications that support interactivity in environments that have restricted resources typically face many challenges. For example, with Microsoft Corporation's HDi™ interactivity technology, developers can facilitate advanced navigation and interaction with features and content (called "interactive content") on platforms as diverse as video game consoles and mobile devices such as personal media players and phones. HDi applications are written using a mix of markup such as XML (eXtensible Markup Language) and script such as ECMAScript standardized by Ecma International in the ECMA-262 specification, which can provide powerful and rich user experiences when engaging with interactive content and features. However, the development environment for HDi applications can be complex. HDi applications are typically developed in compliance with various restrictions and design rules that may be imposed due to platform and resource limitations, as well as those that may be associated with application portability or standardization, for example. Developers have to deal with time synchronicity of the interactive content using the markup and script while complying with restrictions on how many lines of code and XML elements may be used, how many pixels can be ready to draw onto a device display at a time, and so on.

Current validation tools having applicability to HDi application development will typically only validate the XML schema or verify the ECMAScript syntax. In addition, such post-authoring tools do not enable developers to interactively verify the correctness of their applications in a real-time manner (i.e., as the application code executes as in a runtime environment). Application developers may need to resort to trial and error which can lengthen the development cycle and add costs, or the developers may become overly conservative in their application design to avoid running afoul of the rules or restrictions.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A validation tool providing real-time validation of interactive content applications, such as HDi applications, includes a static analysis engine that extrapolates the timeline of an application and the application's behavior over that timeline. The static analysis engine watches various types of data associated with the application's markup and works through an editor (i.e., a user interface, or "UI") to inform the user of changes in compliance with applicable requirements and/or performance implications for the application as the application is being built. For example, if the user generates an XML document that is too large, creates an attribute that is too long, or overflows the pixel buffer, the validation tool will immediately point out such error conditions so that the user may make corrections before going any further.

The validation tool is further configured with a dynamic simulator that is arranged as a state machine. The dynamic simulator and the static analysis engine may share state information to enable the validation tool to display a time graph of the application lifetime and useful information such as pixel buffer usage at a given time code, or other resource utilization. The validation tool is further configured to provide a real-time application preview with which the user may interact to immediately evaluate cause and effect of any changes that are made using the editor to the application code. This preview feature enables a user to engage in rapid prototyping of interactive content without needing to write an entire application or perform other tasks that would normally be required to simulate the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
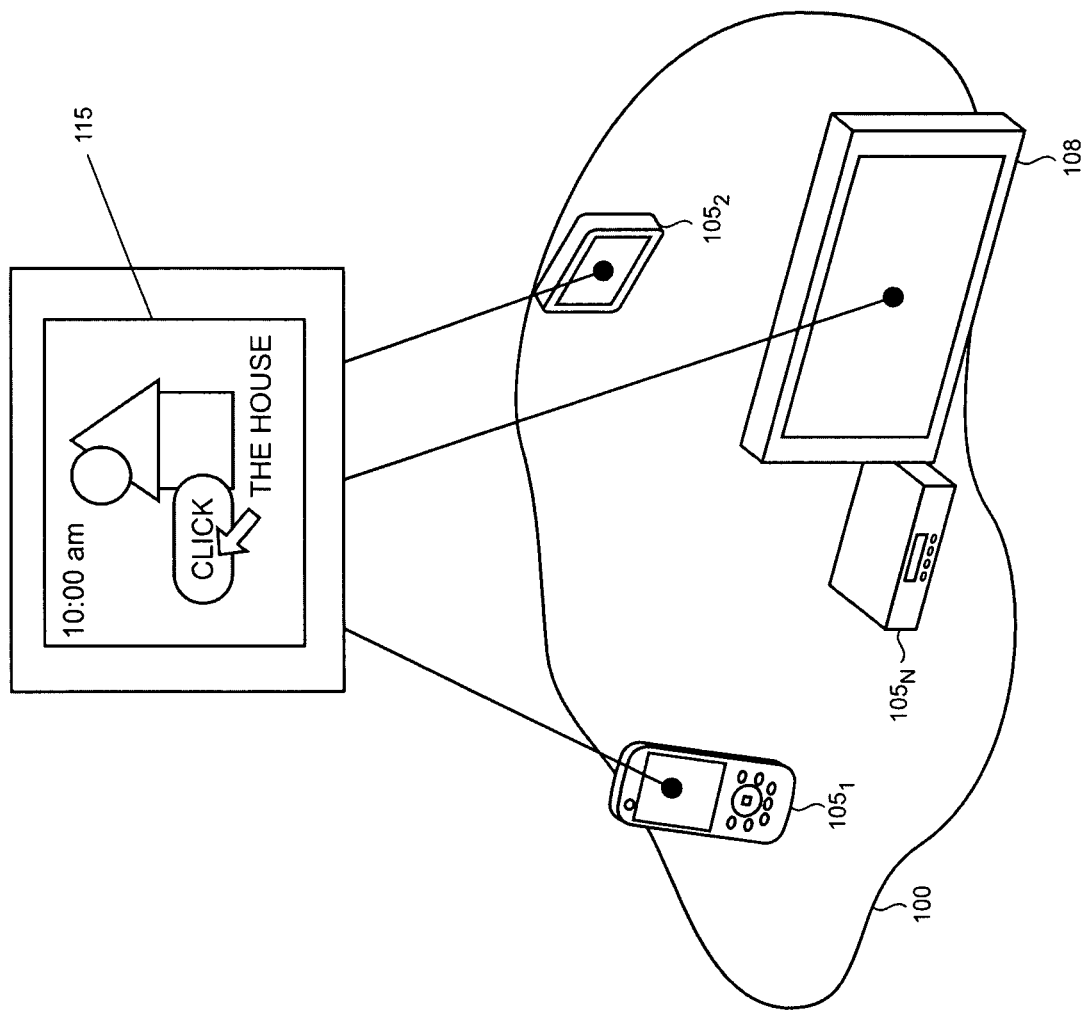
FIG. 1 shows an illustrative interactive media environment in which several illustrative devices each render media content that is composited from multiple graphic planes.

FIG. 1 shows an illustrative interactive media environment 100 in which several illustrative media content rendering devices $105_{1, 2 \ldots N}$ are each capable of rendering media content that is composited from multiple graphics planes to support interactive content. Devices 105 are representative of the various devices that are currently available which can be adapted to host interactive content. Devices 105 include, for example, personal electronic devices such as mobile phones, pocket PCs, handheld PCs, smart phones, PDAs (personal digital assistants), game devices, media content players such as MP3 players (Moving Pictures Expert Group, MPEG-1, audio layer 3), ultra-mobile PCs, and the like, as represented by device $105_1$ in FIG. 1. Also shown in the environment 100 are a set-top box ("STB") $105_2$ that is coupled to a conventional monitor or television 108, and a portable navigation system $105_N$ that uses GPS (Global Positioning System) technology. It is emphasized that these particular devices are illustrative, and other devices may be utilized as required to meet the needs of a given implementation.

The devices shown in FIG. 1 are typically designed to operate with fewer resources, such as memory and processing power, as compared with a personal computer, for example. Accordingly, in this illustrative example, devices 105 run the Microsoft Windows® CE operating system (which is also called Windows Embedded CE). However, in alternative arrangements, other operating systems including, for example Microsoft Windows®, and other types of devices such as desktop and laptop personal computers may be utilized. It is noted that the Windows Vista® operating system for PCs and the Xbox game platform, for example, provide native support for Microsoft's HDi technology. However, resources are generally less restricted with such alternatives.

Figure 2:
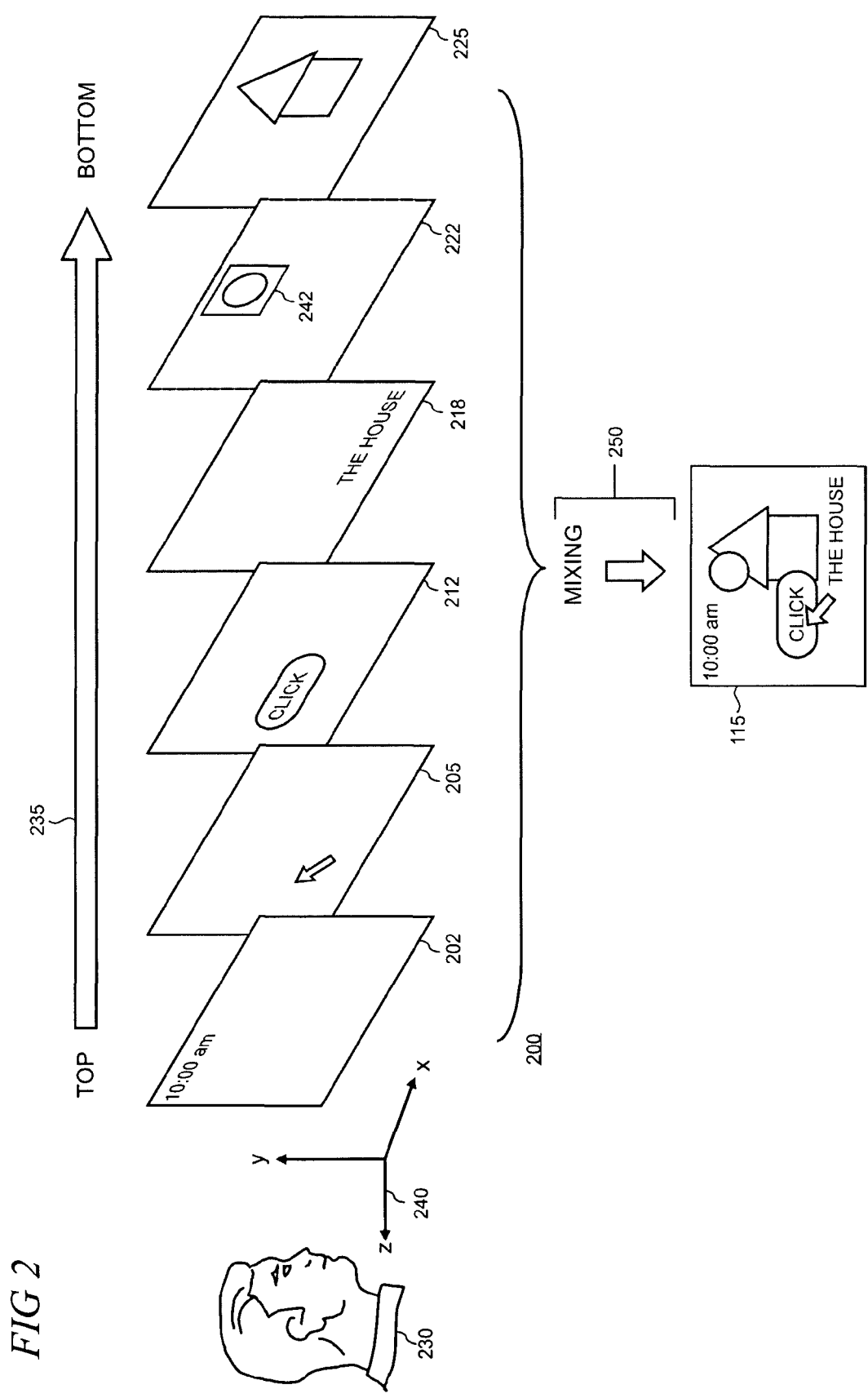
FIG. 2 shows an illustrative set of graphic planes that may be used by an HDi application to create an interactive user experience.

As indicated by reference numeral 115, an illustrative interactive UI is supported by the devices 105. UI 115 is implemented in a graphics environment that uses multiple graphic planes, as shown in FIG. 2 and described in the accompanying text. In this example, the UI 115 is implemented using the interactive features provided by HDi technology to enable interactive content such as advanced viewing features including enhanced content, interactive user experiences, navigation, and other functionality to be rendered in real-time as media content (such as a movie or other content) plays on a device 105. Other examples of interactive content include such things as picture-in-picture commentary tracks, zoom features, and user-defined bookmarks.

HDi uses standards including XML, HTML (Hypertext Markup Language), CSS (Cascading Style Sheets), SMIL (Synchronized Media Integration Language), and ECMAScript (also known as JavaScipt). In alternative implementations, other technologies that can support interactive content may be used and the present arrangement is not intended to be limited solely to the use of HDi.

FIG. 2 shows a stack of graphics planes 200 used to support the UI 115 in an HDi runtime environment or in a runtime environment that implements HDi-like behavior. The stack of graphic planes 200 is utilized to logically group visual elements on a device display by function and/or source. In this example, the graphics plane stack 200 includes a cursor plane 205, a graphics plane 212, a subpicture plane 218, a subvideo plane 222, and a main video plane 225. It is noted that the devices 105 shown in FIG. 1 may alternatively utilize a subset of the plane stack 200 in some implementations.

The OSD (on screen display) plane 202 is the topmost plane (i.e., perceived by user 230 as being on top) in the graphics plane stack 200 and includes OSD objects such as date and time information. In applications using an STB, such OSD objects could also include channel or video source information, for example.

The remaining planes are arranged from the top of the display to the bottom, from left to right, as indicated by arrow 235 in FIG. 2. All planes in the graphics plane stack 200 use a common xy coordinate system. A third dimension is described by a z axis which projects outwardly from the display as indicated by reference numeral 240 in FIG. 2. Typically, applications running in an interactive content environment belong to specific planes, as described below. In addition, characteristics of each plane in the stack 200 may differ. For example, the frame rate, color space, resolution, and the size and position of a given plane may be specified independently of other planes in the stack 200.

The cursor plane 205 is the second plane in which cursor objects like pointers are displayed. The graphics plane 212 is the third plane of the graphics plane stack 200 and is generated by the presentation engine as described below in the text accompanying FIG. 3. HDi applications that generate interactive content such as graphics and menus in an interactive media environment are typically rendered into the graphics plane 212.

The subpicture plane 218 is the fourth plane of the graphics plane stack 200 and is typically used to display subtitles and/or captions produced by respective applications. The subvideo plane 222 is the fifth plane in the graphics plane stack 200 and is typically used as a secondary video display in a "picture-in-picture" (PIP) arrangement. A PIP window, like that indicated by reference numeral 242 is often smaller than the main video display and may have other differing characteristics such as reduced resolution, different aspect ratio, etc.

The main video plane 225 is the sixth plane in the graphics plane stack 200 and is positioned at the bottom of the stack of planes. The main video plane 225 is typically used to display video content in the interactive media environment. As shown in FIG. 2, all the planes in the graphics plane stack 200 are mixed and composited into a single display through a mixing process, as indicated by reference numeral 250.

Figure 3:
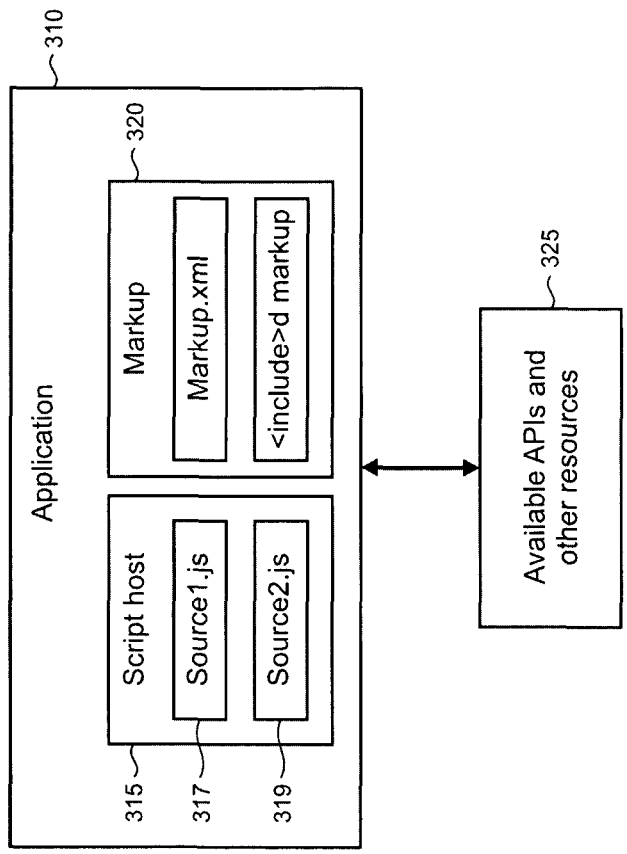
FIG. 3 is an illustrative block diagram showing elements that make up an HDi application.

Referring to FIG. 3, an illustrative block diagram of the elements making up an HDi application 310 used in an interactive media environment 100 (FIG. 1) is shown. Applications are typically used in the interactive media environment 100 to enable interaction between a user and an interactive media player rendering graphics and video on a display. More specifically, applications control presentation behavior of various content objects, including video playback, in the environment. Presentation of graphic objects such as menus and interactive buttons over the video is also realized using applications.

Applications further manage and control audio playback and sounds in the environment 100. It is contemplated that multiple applications will generally be running simultaneously in most interactive media settings. However, there is no requirement that the multiple applications run simultaneously and the decision to divide or aggregate applications in a particular setting is a design choice of the interactive media developer or author. Applications may also be logically subdivided into application pages depending on the requirements of a specific setting.

Applications will generally attempt to run in a time-synchronous manner with the video on the main video plane 225 (FIG. 2) and will thus be aware of time that is kept by various clocks in the HDi runtime environment. These may include, for example a media clock that takes account of "trick play" where the main video is put into fast forward, backwards, or slow-motion, etc., as well as a presentation clock that keeps time just as a real-world clock.

The progression of context execution by applications in the interactive media environment 100 (FIG. 1) is guided by a playlist which describes, among other things, the relationship among objects in the environment including presentation objects that are rendered by the player onto the display device. These presentation objects typically include video and graphics produced by the applications. The playlist further manages resources across the interactive media environment as a single management entity in order to efficiently allocate and control the consumption of resources by applications.

The application 310 comprises a script host 315 containing zero or more script files 317 and 319 and zero or more markup documents 320 that are used to generate a document object model ("DOM"). The markup documents 320 include information relating, for example, to content, style, timing and layout of graphic objects. Thus, the markup context is used generally to provide graphics on the graphics plane 212 (FIG. 2) in the interactive media environment.

In this illustrative example, the markup documents are XML document files in accordance with W3C (World Wide Web Consortium) standards. As indicated in FIG. 3, multiple physical XML files may be accessed using the <include> element in the <head> section of the markup. In some settings it may be preferable for an application to not have more than one active markup at a time. However, an application may switch its markup 320 by using a <link> element in the markup. Alternatively, an application may switch its markup 320 by utilizing an application programming interface ("API") that enables applications to gain access to functional objects within a current application. Using a loadMarkup ( ) call through the API, an application may switch markup files 320 by passing the Uniform Resource Identifier ("URI") of the new markup through an API.

In cases where an application accesses a new markup, the API call takes effect only after a current event handler in the application finishes executing its current task. Any current markup-related event handlers that are pending are also cancelled as the new markup, once loaded, will invalidate those event handlers.

As noted above, script host 315 contains script files 317 and 319 which are used along with the markup 320 to implement interactive media experiences. Script files 317 and 319 may be implemented, for example, using ECMAScript as defined by Ecma International in the ECMA-262 specification. Common scripting programming languages falling under ECMA-262 include JavaScript and JScript. In some settings, it may be desirable to implement scripts 317 and 319 using a subset of ECMAScript 262, in particular ECMA-327, along with a host environment and a set of common APIs. Script context in most settings is utilized to deal with interactive control issues from the user along with system events, graphics control, video playback, resource management (e.g. use of caching or persistent store resources) and other issues that are not readily or efficiently implemented solely using markup 320.

The availability of APIs and resources to application 310 is indicated by reference numeral 325 in FIG. 3. Resources include, for example, audio and video files, fonts, pictures and images (e.g., in common file formats including PNG, JPEG, GIF, BMP, TIFF, etc.), and other resources as may be required by an application according to the circumstances of a specific setting.

Each application 310 maintains its own script host 315 that maintains the context for the script's variables, functions, and other states. In most settings, variables and functions in one application are not visible to another application unless the applications are specifically set up to enable such cross-application visibility, for example, by using an object that is shared across all applications.

Figure 4:
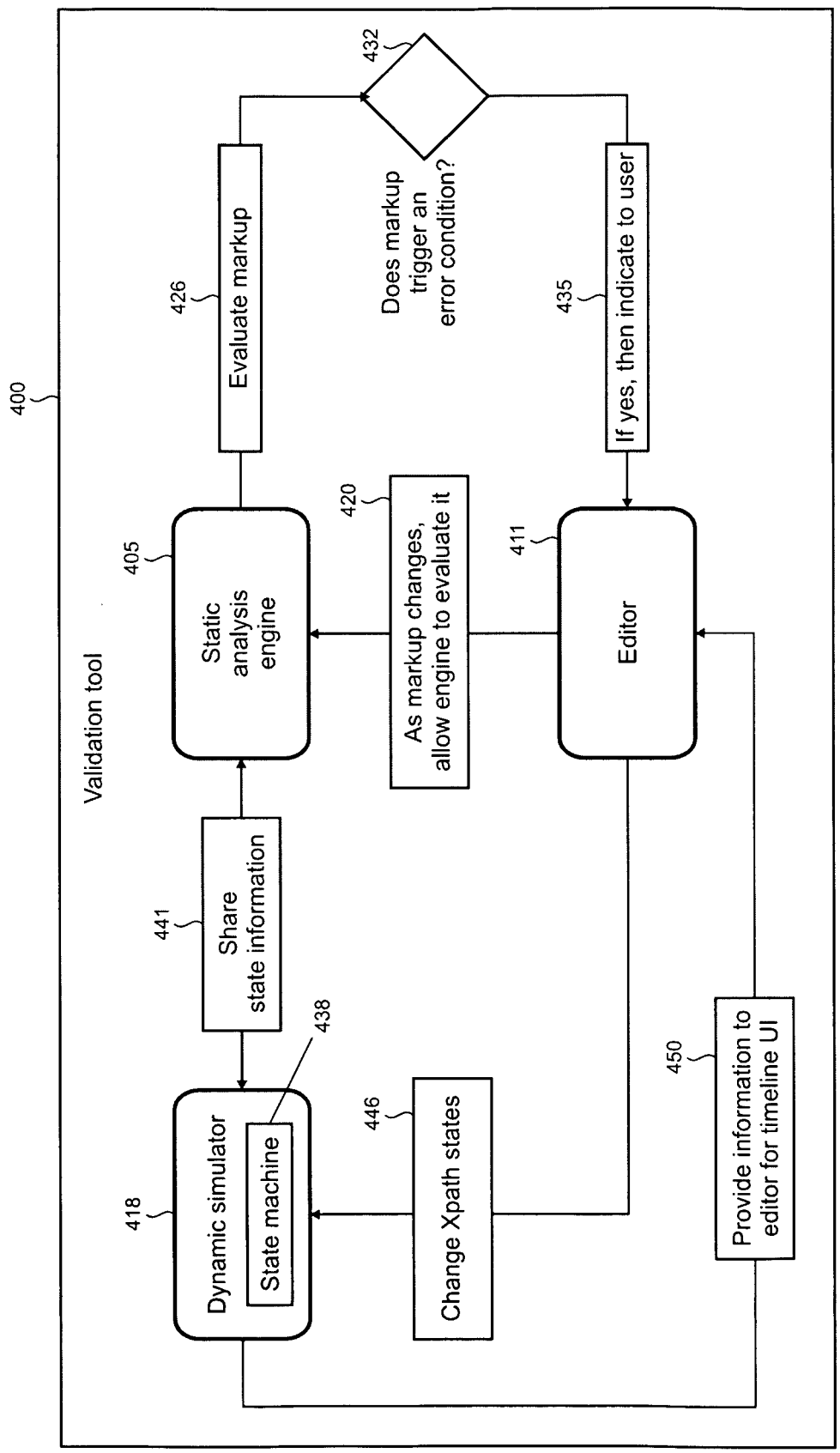
FIG. 4 shows an illustrative architecture for a validation tool.

FIG. 4 shows an illustrative architecture for a validation tool 400 that can provide real-time validation for an application (e.g., application 310 in FIG. 3) as it is being built. The validation tool 400 includes a static analysis engine 405 and a dynamic simulator 418 that provide functionality to make a user of the tool aware of changes in the compliance or the performance implications of an application markup through a UI which supports an editor 411 through which the user may enter text to edit the XML code in the markup component 320. Both the static analysis engine 405 and dynamic simulator 418 can be implemented as background processes as the validation tool 400 runs.

Figure 5:
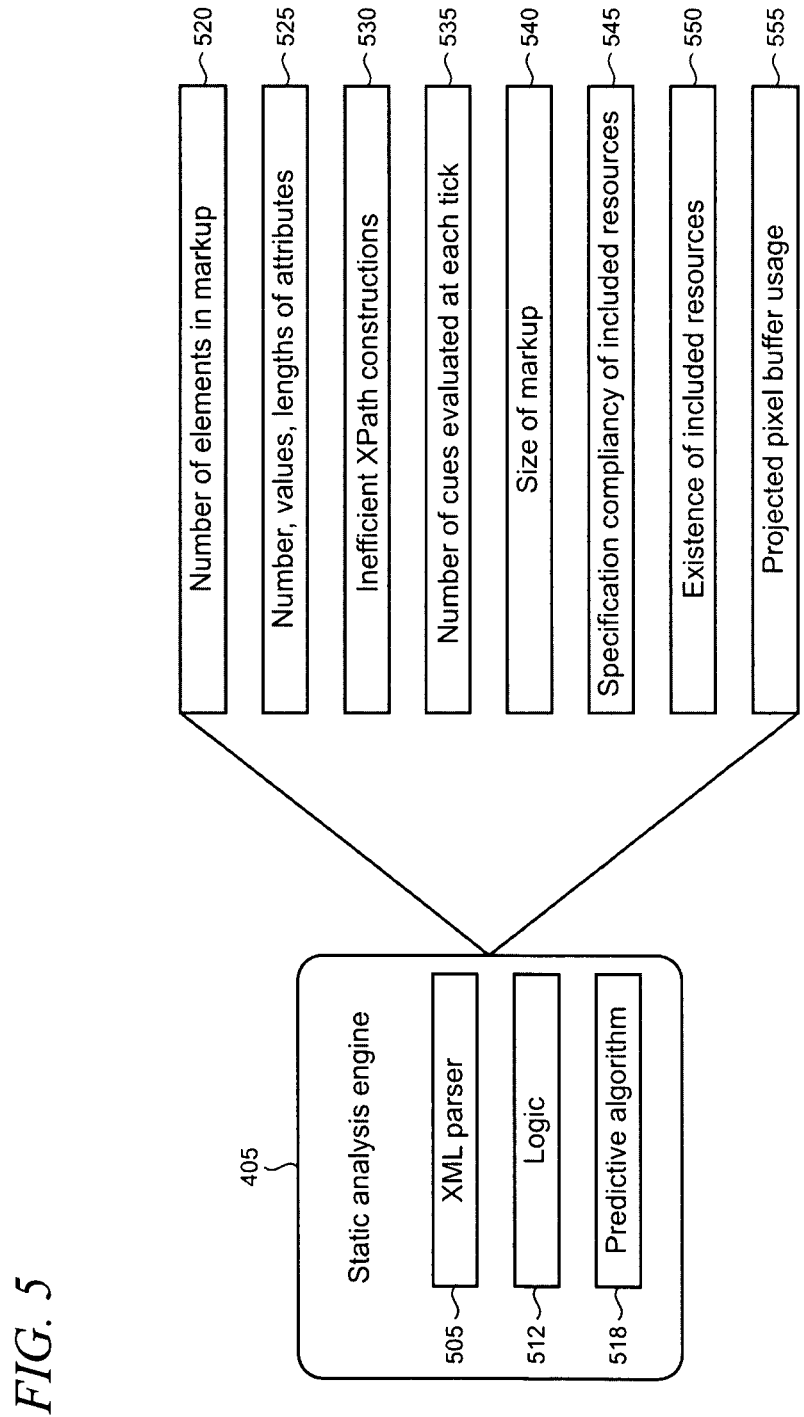
FIG. 5 shows illustrative components of the static analysis engine in the validation tool.

As shown in FIG. 5, the static analysis engine 405 will contain an XML parser 505 that is used to parse the XML markup 320. A logic component 512 is provided in the engine 405 to assign meaning to the XML code that is parsed from the markup 320. A predictive algorithm 518 in the static analysis engine 405 is utilized to extrapolate the timeline of the application 310 and then analyze the behavior of the application 310 over that timeline.

The static analysis engine 405 is configured to internally complete any incomplete XML markup 320, for example by automatically closing any open XML tags. This completion ensures that the markup 320 will be in an appropriate format to be analyzed. The static analysis engine 405, in this example, is configured to monitor and analyze various types of data including:

a) the number of elements in a markup document;
 b) the number, values, and lengths of XML attributes;
 c) inefficient XPath query constructions (e.g., //*[@id=""] instead of id(""));
 d) the number of cue points that will be evaluated at each tick of the media clock (where cue points may be used to fire an event, script, etc.);
 e) the size of the markup document;
 f) specification compliancy of included resources (e.g., as specified in src="" attributes);
 g) existence of included resources;
 h) projected pixel buffer usage;

as indicated by reference numerals 520-555 in FIG. 5. However, it is emphasized that the data listed above is intended to be illustrative and that other types of data may also be monitored and analyzed to meet the requirements of a particular implementation scenario. For example, some data to be monitored and analyzed can be selected from applicable HDi specifications, while others may be chosen based on customary application design practices. In addition, it is noted that some restrictions that are imposed on HDi applications may not necessarily be explicitly mandated in any available specifications or documentation. For example, hardware limitations of devices used to support a given HDi application essentially have become "de facto standards" to which developers must adhere.

Returning to FIG. 4, when the user enters text into the editor 411 to edit the markup 320, changes to the markup may be evaluated (as indicated by reference numeral 420) by the static analysis engine 405. The engine 405 will evaluate the markup (426) with regard to the monitored and analyzed data listed above. If a pre-defined value or threshold (which could be a value from an applicable specification, design requirement, or other set limit, etc.) is exceeded by the markup 320 which triggers an error condition (432), then the error is indicated to the user (435) through the editor 411.

Advantageously, the feedback to the user can be provided as an application is being built. For example, if the user creates a DOM that is too large, creates an attribute that is too long, or overflows the pixel buffer, the validation tool 400 will immediately point such error conditions out so that the user may correct the code before going any further.

The dynamic simulator 418 may be configured to provide several functionalities. As a simulator, it may be configured as a state machine 438. The state machine 438 gets built up from the "begin" and "end" XPath expressions in the markup 320. The dynamic simulator 418 will need to evaluate the XPath expressions, but rather only use them as entry and exit conditions of the state. The dynamic simulator 418 is configured to share state information (441) with the static analysis engine 405 as necessary for the engine to evaluate scenarios driven by the markup 320 that require state information. However, it is noted that the static analysis engine will also evaluate parts of the markup 320 that do not require state information such as element count and attribute length in the XML code.

Utilization of the state machine 438 enables the validation tool 400 to display pixel buffer usage by the application 310 at an exact time code through the UI embodied in the editor 411. For example, the user may set (i.e., "force") a given XPath query in the markup 320 to "true" (446) to drive the state machine 438 and then evaluate the effect on the pixel buffer. The dynamic simulator 418 may then return information to the editor (450) to display as a timeline UI (as shown below in FIG. 6 and described in the accompanying text).

It may be possible for the validation tool 400 to test all possible combinations of XPath expressions using a projected input model and verify if there is any possibility that the pixel buffer will overflow. If so, then the static analysis engine 405 can flag the appropriate time code and the combination of cues that would cause such error.

Figure 6:
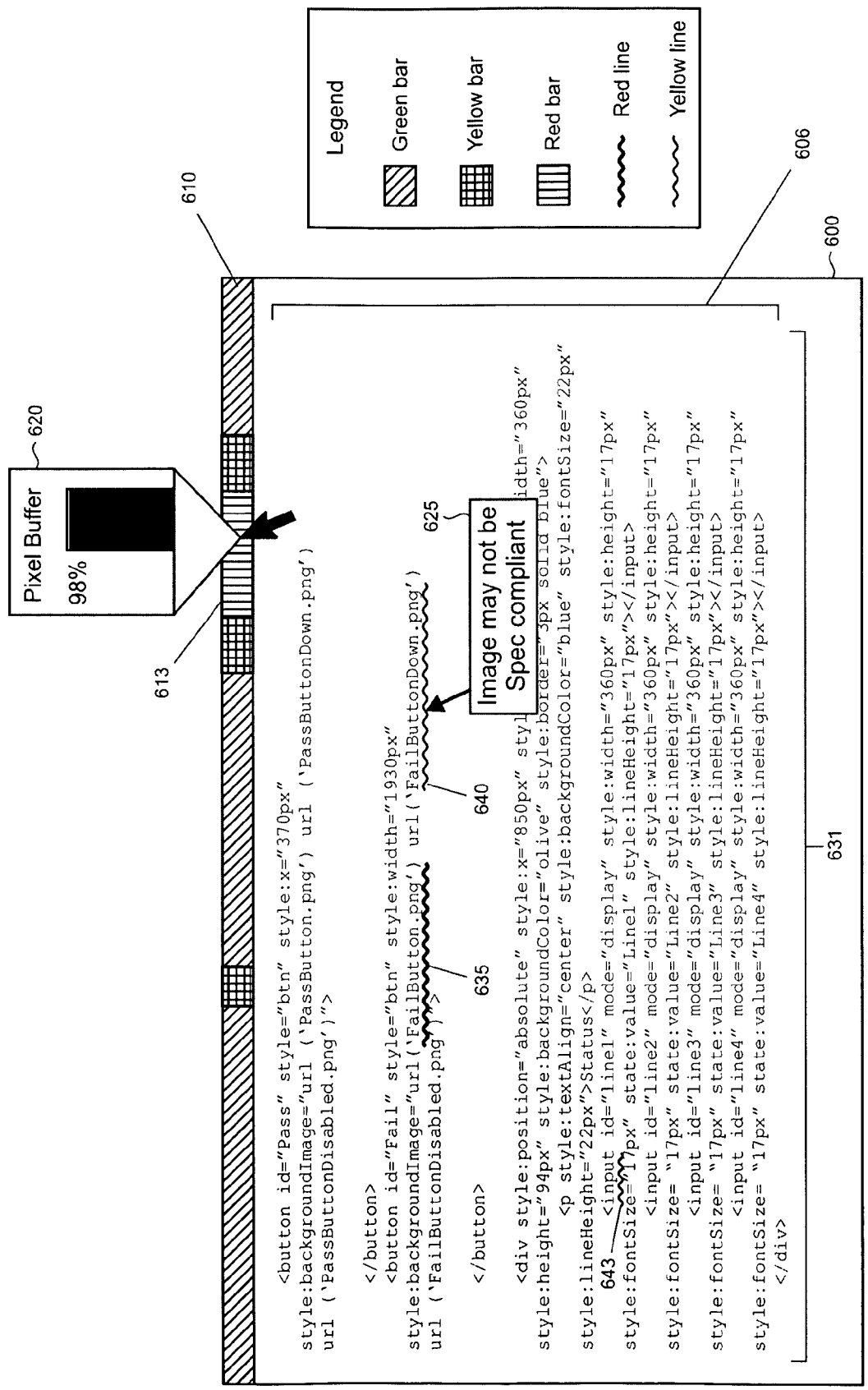
FIG. 6 shows an illustrative UI window supported by the validation tool.

FIG. 6 shows an illustrative UI window 600 that is provided by the editor 411 (FIG. 4). The editor window 600 displays a portion of XML code 606 that is part of the application 310 (FIG. 3). At the top of the editor window 600 is a timeline graph 610 which, in this example, is color coded to indicate danger of overflowing the pixel buffer at each point in time. As shown, green, yellow, and red bars are used for indicating increasing danger of overflowing the pixel buffer.

In some implementations the timeline graph 610 may be configured so that additional and/or detailed information is made available to the user when a portion of the graph is selected. For example, when the red bar 613 is clicked by the user, it expands to show a bar graph 620 that indicates the level of the pixel buffer to provide a more comprehensive editing experience.

A variety of other indicators may be utilized in the editor window 600 to inform the user of issues with the XML code 606. For example, a pop-up indicator 625 shows that an image 'FailButtonDown.png' included in the code may not comply with an applicable specification. In addition, in a text editing area 631 in the window 600, different types of errors in the XML code are indicated by different colored underlines. In this example, red and yellow lines are used, as representatively indicated by reference numerals 635, 640, and 643. It is emphasized that the timeline graph, bar graph, pop-up indicator, and underlines shown in this example are intended to be illustrative and that other types and kinds of indicators, including textual and graphical indicators, may be used to provide the user with awareness of changes in compliance with applicable requirements or performance of the application, as may be required to meet the requirements of a particular implementation.

The validation tool 400 may be further configured to provide a real-time application preview. In this mode, the user can preview and interact with the interactive content that would be generated by the application 310 during runtime. It is assumed for this example that the application provides a menu that flies into position over a movie as it plays on a device, and then the menu dissolves when a menu choice is made.

Figure 7:
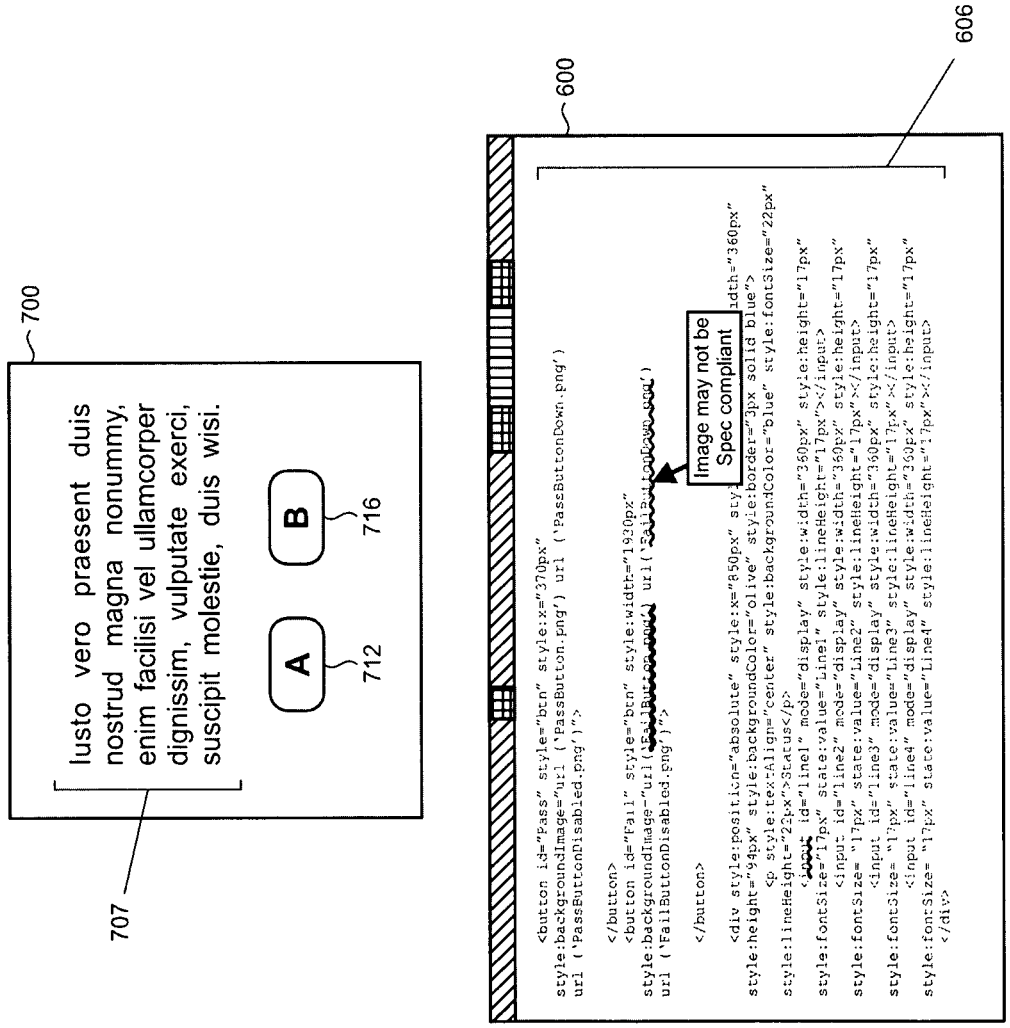
FIG. 7 shows an illustrative preview of a menu provided by an application as interactive content.

As shown in FIG. 7, a preview of the menu (indicated by reference numeral 700) includes some text 707 and a choice of two buttons 'A' and 'B' as respectively indicated by reference numerals 712 and 716. The user may interact with the previewed menu 700, for example, by manipulating the buttons 712 and 716 while also editing the XML code 606 in the editor window 600. In this way, the user may readily see cause and effect, how any animation used in the application progresses over time, and what would happen in the menu if a specific cue in the code were to be triggered.

This level of real-time validation provides the user with enhanced functionality that goes beyond evaluating only pixel buffer usage. This enhanced functionality may be expected to typically enable a user to engage in rapid prototyping of interactive content such as menus and other navigation aids without needing to step through all the normal intermediate steps such as creating an entire application, writing a playlist, and starting up a full blown simulator or media player device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable medium not comprising a propagated data signal containing instructions which, when executed by one or more processors disposed in an electronic device, implement a validation tool for performing validation of a software application, comprising:
    a static analysis engine configured for extrapolating a timeline of the software application and analyzing behavior of the application over the timeline, the software application providing interactive content as application code executes during an application build process, the interactive content including graphics to be rendered in a graphics plane, the analyzing including at least i) determining compliance with specifications that are applicable to the application, and ii) determining whether the application exceeds performance limitations of its execution environment, at least one of the performance limitations being pixel buffer usage;
    a dynamic simulator configured for creating a time graph that indicates the behavior of the application over the timeline; and
    a user interface configured for displaying the time graph, the dynamic simulator being further configured as a state machine to display the pixel buffer usage at a time code through the user interface;
    an editor supported by the user interface through which the application code may be edited, the static analysis engine being configured to evaluate changes made to the application by editing to thereby provide feedback as the application is being built.

2. The computer-readable medium of claim 1 in which the application comprises zero or more markup components and zero or more script components.

3. The computer-readable medium of claim 2 in which the application comprises an HDi application.

4. The computer-readable medium of claim 1 in which the execution environment is provided by a device selected from one of PC, set-top box, game console, mobile phone, PDA, personal media player, smart phone, GPS unit, handheld game device, or laptop computer.

5. The computer-readable medium of claim 1 in which the dynamic simulator includes a state machine using XPath expressions to determine entry and exit conditions of the state.

6. The computer-readable medium of claim 2 in which the user interface further is configured with an editor for displaying and editing code in the zero or more markup components.

7. The computer-readable medium of claim 2 in which the analyzing is performed by watching data, the data being selected from at least one of number of elements in the markup, number of attributes, values of attributes, length of attributes, inefficient XPath expression construction, number of cues to be evaluated at each clock tick, size of the markup, compliancy of included resources to applicable specification, or projected pixel buffer usage.

8. The computer-readable medium of claim 2 in which the static analysis engine is further configured for internally completing uncompleted markup by closing open tags.

9. The computer-readable medium of claim 1 in which the user interface is further arranged to display error conditions in the code responsively to the analyzing.

10. The computer-readable medium of claim 9 in which the user interface displays the error conditions in real-time as a user makes edits to code in the application.

11. A method of operating a real-time validation tool embodied as software, the method comprising the steps of:
   extrapolating a timeline of an application as it is being built which provides interactive content that includes graphics to be rendered in a graphics plane when executing, the application comprising at least XML code, the timeline comprising an effect of the code on a system parameter over a lifetime of the application, the system parameter including pixel buffer usage;
   providing a user interface that is arranged for i) displaying the timeline and the pixel buffer usage and ii) displaying an editing window that displays the XML code, and iii) accepting edits to the code; and
   receiving edits from a user through the user interface to set one or more XPath queries in the code to true to enable evaluation of the effect on the system parameter as the application is being built.

12. The method of claim 11 in which the system parameter comprises pixel buffer level.

13. The method of claim 11 including a further step of indicating error conditions in the code through the user interface.

14. The method of claim 13 in which the indicating is performed using one of color coding, underlining, pop-ups, textual indicators, or graphic indicators that are displayed in the editing window.

* * * * *